(12) United States Patent
Okuno et al.

(10) Patent No.: US 9,438,811 B2
(45) Date of Patent: Sep. 6, 2016

(54) EXPOSURE CONTROL APPARATUS, IMAGE CAPTURING APPARATUS AND METHOD OF CONTROLLING EXPOSURE

(71) Applicant: Sony Corporation, Tokyo (JP)

(72) Inventors: Takayuki Okuno, Kanagawa (JP); Ayumu Kobayashi, Kanagawa (JP); Masaki Shimizu, Kanagawa (JP)

(73) Assignee: Sony Corporation, Tokyo (JP)

( * ) Notice: Subject to any disclaimer, the term of this patent is extended or adjusted under 35 U.S.C. 154(b) by 144 days.

(21) Appl. No.: 14/230,624

(22) Filed: Mar. 31, 2014

(65) Prior Publication Data

US 2014/0320694 A1 Oct. 30, 2014

(30) Foreign Application Priority Data

Apr. 30, 2013 (JP) ................................. 2013-094975

(51) Int. Cl.
*H04N 5/235* (2006.01)
*H04N 5/243* (2006.01)

(52) U.S. Cl.
CPC .......... *H04N 5/2351* (2013.01); *H04N 5/2353* (2013.01); *H04N 5/243* (2013.01)

(58) Field of Classification Search
CPC .............................. H04N 5/353; H04N 5/202
USPC ....................................................... 348/229.1
See application file for complete search history.

(56) References Cited

U.S. PATENT DOCUMENTS

| 6,564,014 B1* | 5/2003 | Takeuchi | G03B 7/16 396/157 |
| 2006/0285008 A1* | 12/2006 | Segawa | H04N 5/2354 348/370 |
| 2009/0284616 A1* | 11/2009 | Daiku | H04N 5/202 348/229.1 |

FOREIGN PATENT DOCUMENTS

JP 2010-161459 7/2010

* cited by examiner

*Primary Examiner* — Twyler Haskins
*Assistant Examiner* — Fayez Bhuiyan
(74) *Attorney, Agent, or Firm* — Michael Best & Friedrich LLP

(57) ABSTRACT

There is provided an exposure control apparatus including a photometry amount acquisition unit for acquiring a measured light amount as a photometry amount; a light emission amount control unit for increasing a light emission amount of a light emission unit as the photometry amount is smaller when the photometry amount is within a certain light amount range; and a gain control unit for increasing a gain to an output signal of an image sensor as the photometry amount is smaller when the photometry amount is not within the light amount range and setting the gain to a constant value when the photometry amount is within the light amount range, an image capturing apparatus including the exposure control apparatus, and a method of controlling exposure using the apparatus.

14 Claims, 10 Drawing Sheets

EXPOSURE CONTROL APPARATUS, IMAGE CAPTURING APPARATUS AND METHOD OF CONTROLLING EXPOSURE

CROSS REFERENCE TO RELATED APPLICATIONS

This application claims the benefit of Japanese Priority Patent Application JP 2013-094975 filed Apr. 30, 2013, the entire contents of which are incorporated herein by reference.

BACKGROUND

The present technology relates to an exposure control apparatus, an image capturing apparatus and a method of controlling exposure. More particularly, the present technology relates to an exposure control apparatus, an image capturing apparatus and a method of controlling exposure that control a gain to an image signal.

SUMMARY

In the related art, an image capturing apparatus may have an auto exposure (AE) function in order to provide an exposure amount having an adequate value. By the AE, an aperture value, a shutter speed, a gain and the like are controlled. The gain is an amplification degree when an image signal from an image sensor is amplified, and is controlled by an AGC (Automatic Gain Control) circuit.

For example, Japanese Patent Application Laid-open No. 2010-161459 proposes an image capturing apparatus where a level of the image signal is detected upon the AE and an image is captured by increasing the gain as the level of the image signal is low.

In the above-described related art, an image quality of the image captured may be lowered. In general, as the gain of the image signal increases, a noise of the image signal amplified increases. Accordingly, in the above-described image capturing apparatus, when the gain increases, the noise may decrease the image quality of the image. Meanwhile, if the gain does not increase, a sufficient exposure amount cannot be provided and the image quality of the image may be lowered due to shortage of the exposure.

In view of the circumstances as described above, the present technology is devised. It is desirable to provide an image capturing apparatus for providing an image having an improved image quality.

According to an embodiment of the present technology, there is provided an exposure control apparatus, including:

a photometry amount acquisition unit for acquiring a measured light amount as a photometry amount;

a light emission amount control unit for increasing a light emission amount of a light emission unit as the photometry amount is smaller when the photometry amount is within a certain light amount range; and a gain control unit for increasing a gain to an output signal of an image sensor as the photometry amount is smaller when the photometry amount is not within the light amount range and setting the gain to a constant value when the photometry amount is within the light amount range, and a method of controlling exposure. This enables the light emission amount in the light emission unit to increase and the gain to set to the constant value when the photometry amount is within the certain light amount range.

According to the embodiment, the light emission amount control unit may set the light emission amount to a constant amount when the photometry amount is not within the light amount range. This enables the light emission amount to be the constant amount when the photometry amount is not within the light amount range.

According to the embodiment, the light emission control unit may turn on the light emission unit when the photometry amount acquired during the light emission unit is turned off is less than one of two threshold values, and turn off the light emission unit when the photometry amount acquired during the light emission unit is turned on exceeds the rest of the two threshold values. This enables the light emission unit to turn on when the photometry amount during the light emission unit is turned off is less than one of two threshold values and the light emission unit to turn off when the photometry amount during the light emission unit is turned on exceeds the rest of the two threshold values.

According to the embodiment, the exposure control apparatus further includes an exposure time control unit for controlling an exposure time of the image sensor by synchronizing with a timing signal having a frequency provided by multiplying a reference frequency; and a pulse signal generation unit for generating a pulse signal having a frequency provided by multiplying the reference frequency, in which the light emission unit emits light depending on a pulse width of the pulse signal. This enables the exposure time to control by synchronizing with the timing signal having the frequency provided by multiplying the reference frequency and the light emission unit to emit light during a turn on period of the pulse signal having the frequency provided by multiplying the reference frequency.

According to the embodiment, the exposure time control unit starts to expose the image sensor by synchronizing with the timing signal, and the light emission amount control unit starts to emit light in the light emission unit by synchronizing with the timing signal. This enables the exposure and the light emission to start by synchronizing with the timing signal.

According to another embodiment of the present technology, there is provided an image capturing apparatus, including:

a photometry amount acquisition unit for acquiring a measured light amount as a photometry amount;

a light emission amount control unit for increasing a light emission amount of a light emission unit as the photometry amount is smaller when the photometry amount is within a certain light amount range;

a gain control unit for increasing a gain to an output signal of an image sensor as the photometry amount is smaller when the photometry amount is not within the light amount range and setting the gain to a constant value when the photometry amount is within the light amount range; and an image capturing unit for capturing an image including the output signal. This enables the light emission amount in the light emission unit to increase and the gain to set to the constant value when the photometry amount is within the light amount range.

These and other objects, features and advantages of the present technology will become more apparent in light of the following detailed description of best mode embodiments thereof, as illustrated in the accompanying drawings.

DETAILED DESCRIPTION OF EMBODIMENTS

Hereinafter, embodiments of the present technology will be described with reference to the drawings.

The embodiments of the present technology will be described in the following order.
1. First Embodiment (light amount is controlled and gain is held constant within a certain light amount range)
2. Second Embodiment (light amount is controlled by pulse signal having frequency provided by multiplying frequency of synchronization signal and gain is held constant within a certain light amount range)

1. First Embodiment

Configuration Example of Image Capturing Apparatus

Figure 1:
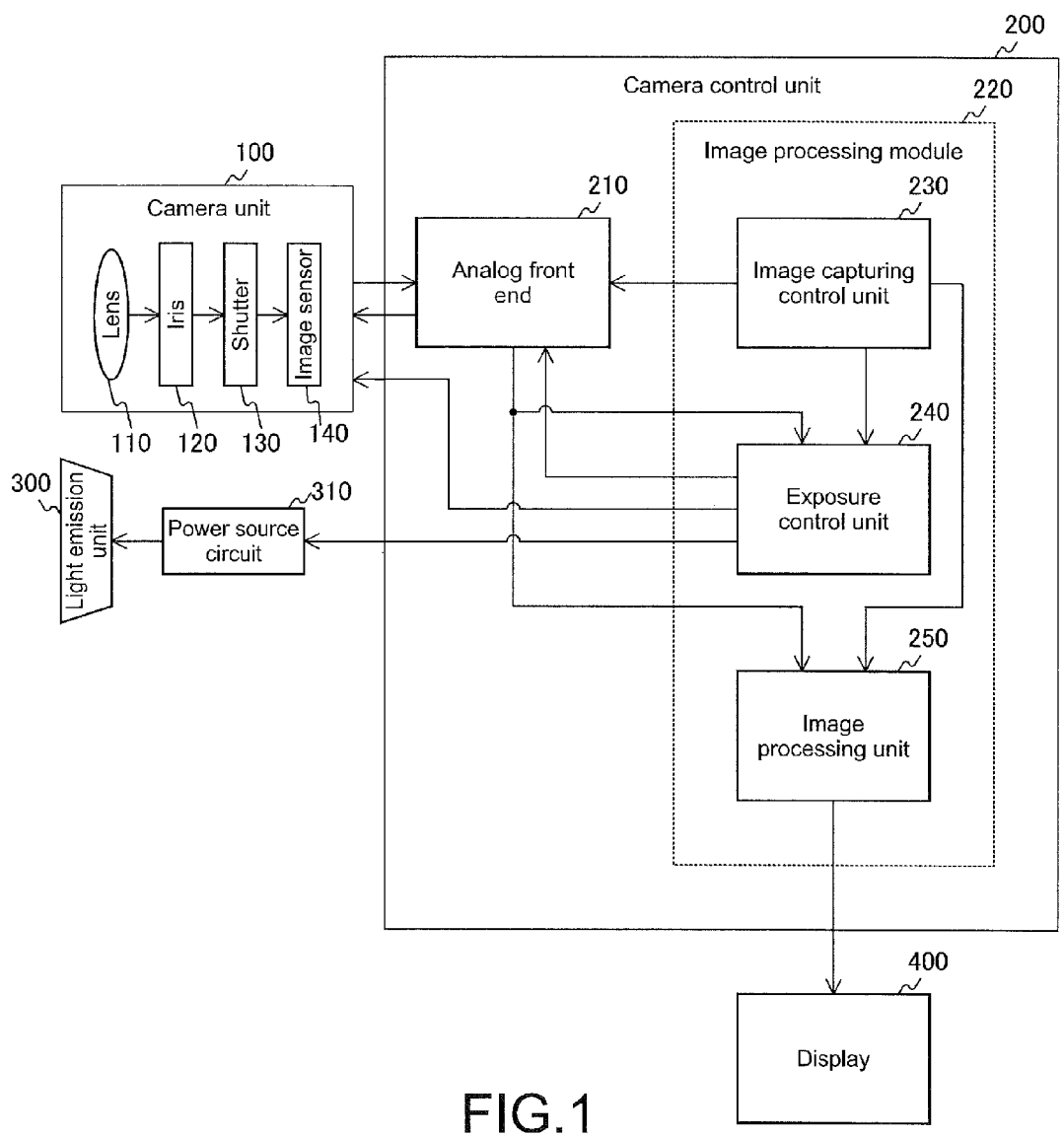
FIG. 1 is a block diagram showing a configuration of an image capturing apparatus according to a first embodiment.

FIG. 1 is a block diagram showing a configuration of an image capturing apparatus according to a first embodiment. The image capturing apparatus is for capturing an image and includes a camera unit 100, a camera control unit 200, a light emission unit 300, a power source circuit 310 and a display 400.

The camera unit 100 includes a lens 110, an iris 120, a shutter 130 and an image sensor 140. The lens 110 forms an image to be captured on the image sensor 140. The lens 110 includes a focus lens, a zoom lens or the like.

The iris 120 regulates an amount of light passing through itself by an aperture blade. An aperture value regulated by the iris 120 is controlled by an exposure control unit 240.

The shutter 130 is a light shielding member that opens during exposure and closes otherwise. The shutter speed when the shutter 130 opens is controlled by the exposure control unit 240.

The image sensor 140 photoelectrically converts light from the lens 110 and outputs an electric signal converted to an analog front end 210 as an image signal. The image sensor 140 can be configured by a CCD (Charge Coupled Device), a CMOS (Complementary Metal Oxide Semiconductor) sensor or the like.

The camera control unit 200 controls the camera unit 100, and includes the analog front end 210 and an image processing module 220. The image processing module 220 includes an image capturing control unit 230, the exposure control unit 240 and an image processing unit 250.

The analog front end 210 converts an analog image signal from the camera unit 100 to a digital signal.

The analog front end 210 amplifies the analog image signal and then converts the analog image signal into a digital signal by a gain set in accordance with a control of the exposure control unit 240. The analog front end 210 supplies the exposure control unit 240 and the image processing unit 250 with the image signal that is converted into the digital signal.

The analog front end 210 generates a timing signal in accordance with the image capturing control unit 230 and supplies the camera unit 100 with the timing signal.

The timing signal is a signal used for determining an output timing of an image signal or a start and end timing of exposure. Specifically, the timing signal includes a vertical synchronization signal. The vertical synchronization signal shows a timing that the image sensor 140 starts to output an image signal.

The image capturing control unit 230 controls an image capturing action of the image capturing apparatus. The image capturing control unit 230 generates an image capturing control signal for instructing a start or end of generation of a timing signal, and supplies the analog front end 210 with the image capturing control signal. For example, when an instruction operation for starting auto exposure (press an AE button down) or an instruction operation for image capturing is carried out, the image capturing control unit 230 starts to generate the timing signal. When an instruction operation for ending the auto exposure or the image capturing is ended, the image capturing control unit 230 ends to generate the timing signal.

In addition, the image capturing control unit 230 feeds a mode control signal with the image processing unit 250. The mode control signal shows an image capturing mode or a preview mode. The image capturing mode is a mode for recording (i.e., capturing) an image on a recording medium such as a memory. The preview mode is a mode for displaying an image on the display 400 in real time without recording an image.

For example, the preview mode is set in an initial state. Once the instruction operation for pressing the shutter button down is carried out to start image capturing, the image capturing control unit 230 changes the mode to the image capturing mode. Note that photometry is necessary in the exposure control unit 240 before a first image is captured. After the photometry is completed, the image capturing control unit 230 changes the mode to the image capturing mode.

The image capturing mode includes a still image capturing mode, an active image capturing mode or the like. The still image capturing mode is for capturing an image. The active image capturing mode is for capturing a plurality of images in time series by synchronizing with the vertical synchronization signal within a setting time period. After an image is captured in the still image capturing mode or after the setting time period is elapsed in the active image capturing mode, the image capturing control unit 230 changes the mode to the preview mode.

The image capturing control unit 230 feeds an exposure setting signal to the exposure control unit 240. The exposure setting signal is for setting the mode to an aperture preference mode or a shutter preference mode. The aperture preference mode is a mode for preferentially controlling an aperture value in the exposure control. The shutter preference mode is a mode for preferentially controlling a shutter speed in the exposure control. These modes are set by a user's operation.

The exposure control unit 240 controls an exposure amount of the image sensor 140. The exposure control unit 240 acquires a photometry amount based on an image signal from the analog front end 210. As the photometry amount, brightness is acquired, for example. Note that the photometry amount is not limited to brightness. For example, the exposure control unit 240 may acquire illuminance instead of brightness as the photometry amount.

The exposure control unit 240 controls an exposure control parameter depending on the brightness. The exposure control parameter includes an aperture value, a shutter speed, a gain of the analog front end 210 and a light emission amount of the light emission unit 300.

The exposure control unit 240 generates an aperture control signal for controlling an aperture value and a shutter control signal for controlling a shutter speed and feeds the camera unit 100 with the signals.

Also, the exposure control unit 240 generates a gain control signal for controlling a gain, feeds the analog front end 210 with the gain control signal, generates a light emission control signal for controlling the light emission amount, and feeds the power source circuit 310 with the gain control signal.

Note that the exposure control unit 240 is an example of the claimed exposure control apparatus.

The light emission unit 300 emits light such as visible light and infrared light. The light emission unit 300 converts electric energy supplied from the light emission unit 310 into light energy. The light emission unit 300 can be configured by a light emitting diode (LED), for example.

The image processing unit 250 processes an image to an image signal. In the image capturing mode, the image processing unit 250 carries out an image processing to the image signal. As the image processing, at least one of a demosaic process and a white balance process, a color balance process and a digital noise reduction process is carried out. These processes may be carried out in any order. Then, the image is recorded by the image processing unit 250 in a memory.

In the preview mode, the image processing unit 250 carries out an image processing to an image signal as necessary that is simpler than that is carried out in the image capturing mode, and outputs an image to the display 400 without recording.

Note that the image processing unit 250 is an example of the claimed image capturing unit.

The power source circuit 310 supplies power to the light emission unit 300. The power source is supplied from a pulse signal at a constant frequency. The frequency of the pulse signal is high enough such that a user does not feel flicker (for example, 120 Hz).

The power source circuit 310 receives the light emission control signal from the exposure control unit 240. The light emission control signal includes a light emission start signal for instructing a start of a light emission control, a light emission end signal for instructing an end of the light emission control, and a pulse width control signal for instructing a pulse width.

Once the light emission start signal is received, the power source circuit 310 starts to feed the light emission unit 300 with the pulse signal. The light emission unit 300 emits light only during a "turn on" period (in other words, the pulse width) when the pulse signal becomes high level. The power source circuit 310 controls the pulse width to the width instructed by the pulse width control signal. In this way, the light emission amount of the light emission unit 300 is controlled. Such control is referred to as PWM (Pulse Width modulation) control. Once the light emission end signal is received, the power source circuit 310 stops the feed of the pulse signal to end the PWM control.

The display 400 displays an image based on the image signal after the image processing.

Configuration Example of Analog Front End

Figure 2:
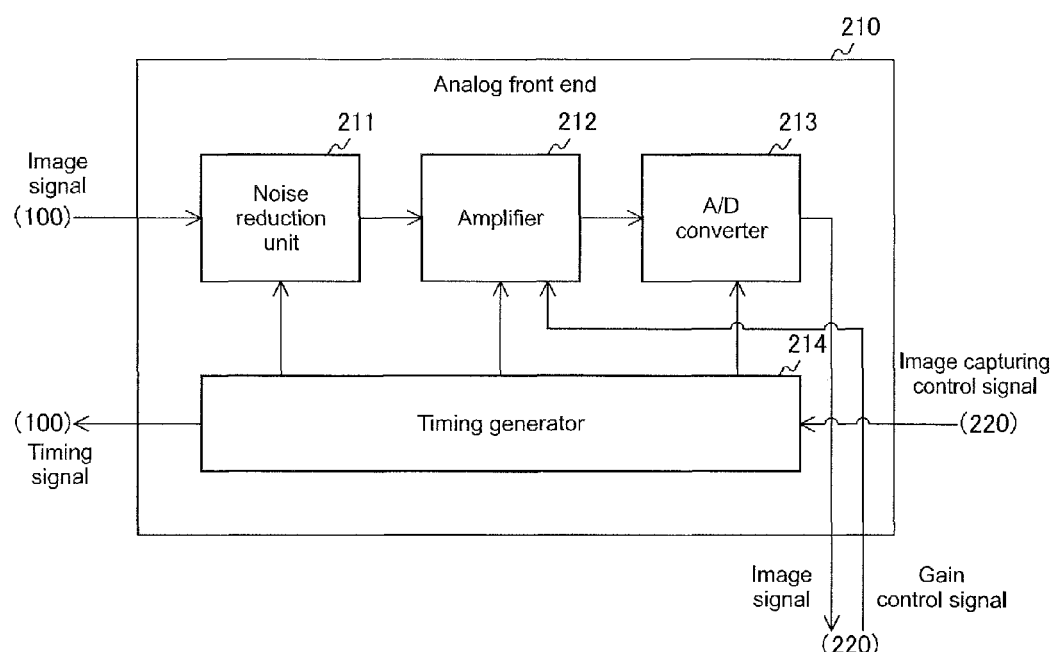
FIG. 2 is a block diagram showing a configuration of an analog front end according to the first embodiment.

FIG. 2 is a block diagram showing a configuration of the analog front end 210 according to the first embodiment. The analog front end 210 includes a noise removal unit 211, an amplifier 212, an A/D converter 213 and a timing generator 214.

The noise removal unit 211 removes a noise from an analog image signal from the camera unit 100. When the image sensor 140 is a CCD, a noise is removed by a CDS (Correlated Double Sampling) circuit, for example. The noise removal unit 211 feeds the amplifier 212 with the image signal processed.

The amplifier 212 amplifies the image signal. The amplifier 212 includes, for example, an AGC (Automatic Gain Control) circuit for adjusting a gain in response to a gain control signal, and amplifies the image signal by the gain adjusted. The amplifier 212 feeds the A/D converter 213 with the image signal amplified.

The A/D converter 213 carries out an A/D (Analog to Digital) converting processing for converting an analog image signal into a digital signal. The A/D converter 213 feeds the image processing module 220 with the image signal A/D converted.

The timing generator 214 generates a timing signal in response to the image capturing control signal. The timing generator 214 feeds the camera unit 100 with the timing signal generated.

Configuration Example of Exposure Control Unit

Figure 3:
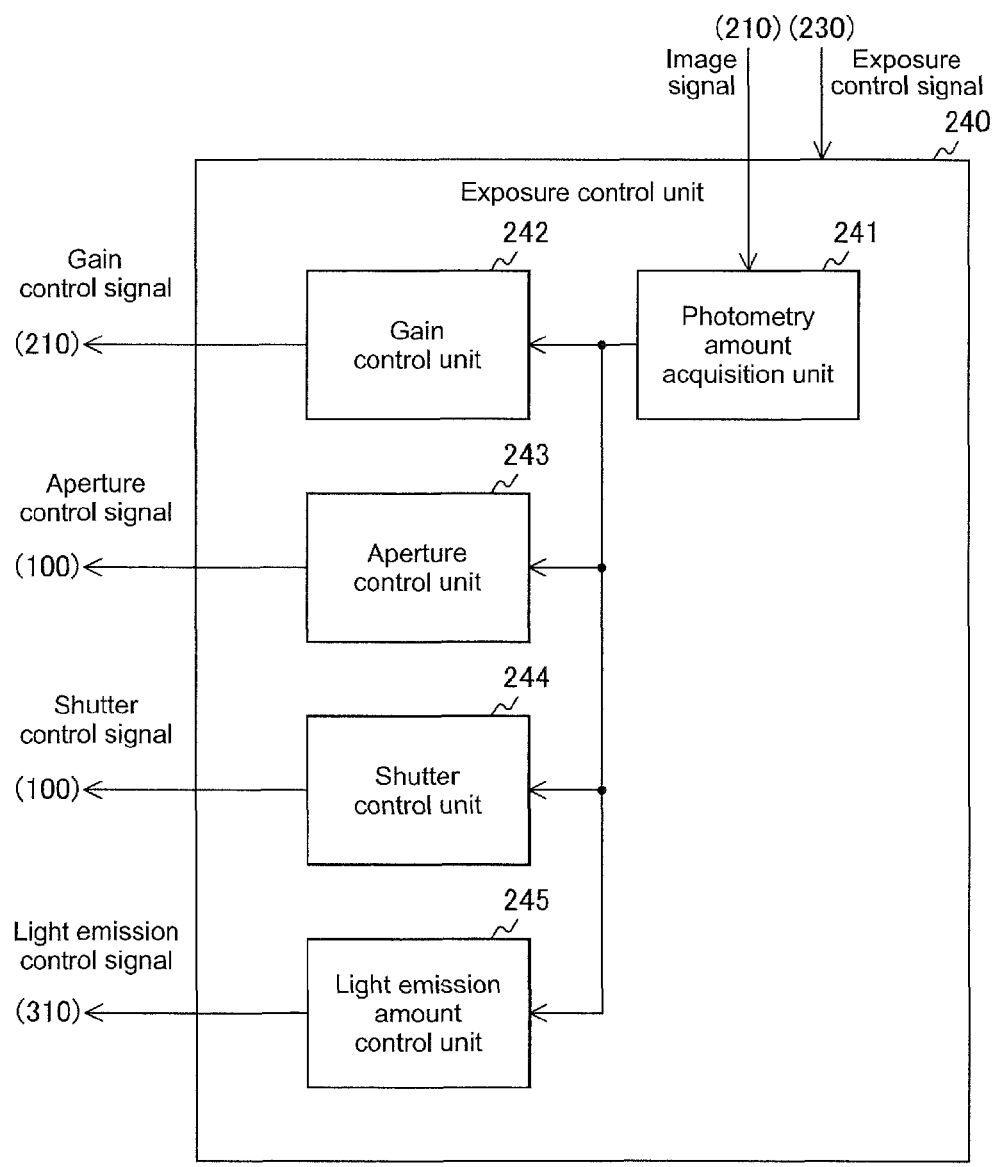
FIG. 3 is a block diagram showing a configuration of an exposure control unit according to the first embodiment.

FIG. 3 is a block diagram showing a configuration of an exposure control unit 240 according to the first embodiment. The exposure control unit 240 includes a photometry amount acquisition unit 241, a gain control unit 242, an aperture control unit 243, a shutter control unit 244 and a light emission amount control unit 245.

The photometry amount acquisition unit 241 acquires a photometry amount by measuring lightness of an object to be imaged. For example, the photometry amount acquisition unit 241 acquires brightness from an image signal as the photometry amount. The brightness is acquired each time the image sensor 140 generates an image signal in response to a vertical synchronizing signal, for example. The photometry amount acquisition unit 241 feeds the brightness acquired to the gain control unit 242, the aperture control unit 243, the shutter control unit 244 and the light emission amount control unit 245.

The photometry amount acquisition unit 241 is configured to acquire the photometry amount from the image signal of the image sensor 140. Note that the configuration is not limited thereto. For example, the image capturing apparatus may further include a photometry sensor carrying out the photometry, and the photometry amount acquisition unit 241 may be configured to acquire the photometry amount from the photometry sensor.

The gain control unit 242 controls a gain in response to the brightness. Specifically, the gain control unit 242 increases the gain as the brightness is lower when the brightness exceeds an upper limit threshold value Th_U.

When the brightness is within a certain light amount range from a lower limit threshold value Th_L to the upper limit threshold value Th_U, the gain control unit 242 set the gain to a constant value G_mid. The lower limit threshold value Th_L is lower than the upper limit threshold value Th_U. The G_mid is a gain value when the brightness has the upper limit threshold value Th_U.

A range of the light amount from the lower limit threshold value Th_L to the upper limit threshold value Th_U may be determined by a maximum light emission amount of a light emitting element in the light emission unit 300. The greater the maximum light emission amount is, the greater a width of an adjustable exposure amount is, which results in a wider light amount range from the lower limit threshold value Th_L to the upper limit threshold value Th_U.

When the brightness is not greater than the lower limit threshold value Th_L, the gain control unit 242 increases the gain as the brightness is lower.

The aperture control unit 243 controls an aperture value in response to brightness. For example, the aperture control unit 243 preferentially controls an aperture value in response to brightness by an aperture value control signal when the preference mode is set by the image capturing control unit 230. Specifically, the aperture control unit 243 opens the aperture to decrease the aperture value when the brightness is lower.

The shutter control unit 244 controls a shutter speed in response to brightness. For example, the shutter control unit 244 preferentially controls a shutter speed in response to brightness by a shutter control signal when a shutter preference mode is set by the image capturing control unit 230. Specifically, the shutter control unit 244 prolongs the shutter speed as the brightness is lower.

The shutter control unit 244 may control the shutter speed by controlling a timing of start and end of the photoelectric conversion in the image sensor 140 instead of a physical member, i.e., the shutter 130. The former system for opening and closing the physical member shutter 130 is called as a mechanical shutter system. In the meantime, the latter system for controlling a photoelectric conversion operation of the image sensor 140 is called as an electron shutter system.

The electron shutter system includes a global shutter system for synchronizing with a vertical synchronizing signal to start exposing and reading-out all pixels at the same time, and a rolling shutter system for synchronizing with a horizontal synchronizing signal to start exposing and reading-out each line in order.

The light emission amount control unit 245 controls a light emission amount of the light emission unit 300 in response to brightness. Specifically, the light emission amount control unit 245 turns on the light emission unit 300 by the PWM control (hereinafter referred to as a "PWM turn on") during the light emission unit 300 is turned off when the brightness is less than a turn on threshold value Th_on. The light emission amount control unit 245 turns off the light emission unit 300 when the brightness exceeds a turn off threshold value Th_off during the PWM turn on.

If the turn on threshold value Th_on and the turn off threshold value Th_off are the same, the light emission unit 300 may repeat the PWM turn on and off when the brightness is changed at around the threshold values. It is therefore desirable that these threshold values are different.

During the PWM turn on, the light emission amount control unit 245 increases the light emission amount as the brightness is lower when the brightness is within the certain light emission amount from the lower limit threshold value Th_L to the upper limit threshold value Th_U. When the brightness exceeds the upper limit value Th_U, the light emission control unit 245 controls the light emission amount to a minimum value L_min. When the brightness is less than the lower limit value Th_U, the light emission control unit 245 controls the light emission amount to a maximum value L_max.

Operation Example of Image Capturing Apparatus

Figure 4:
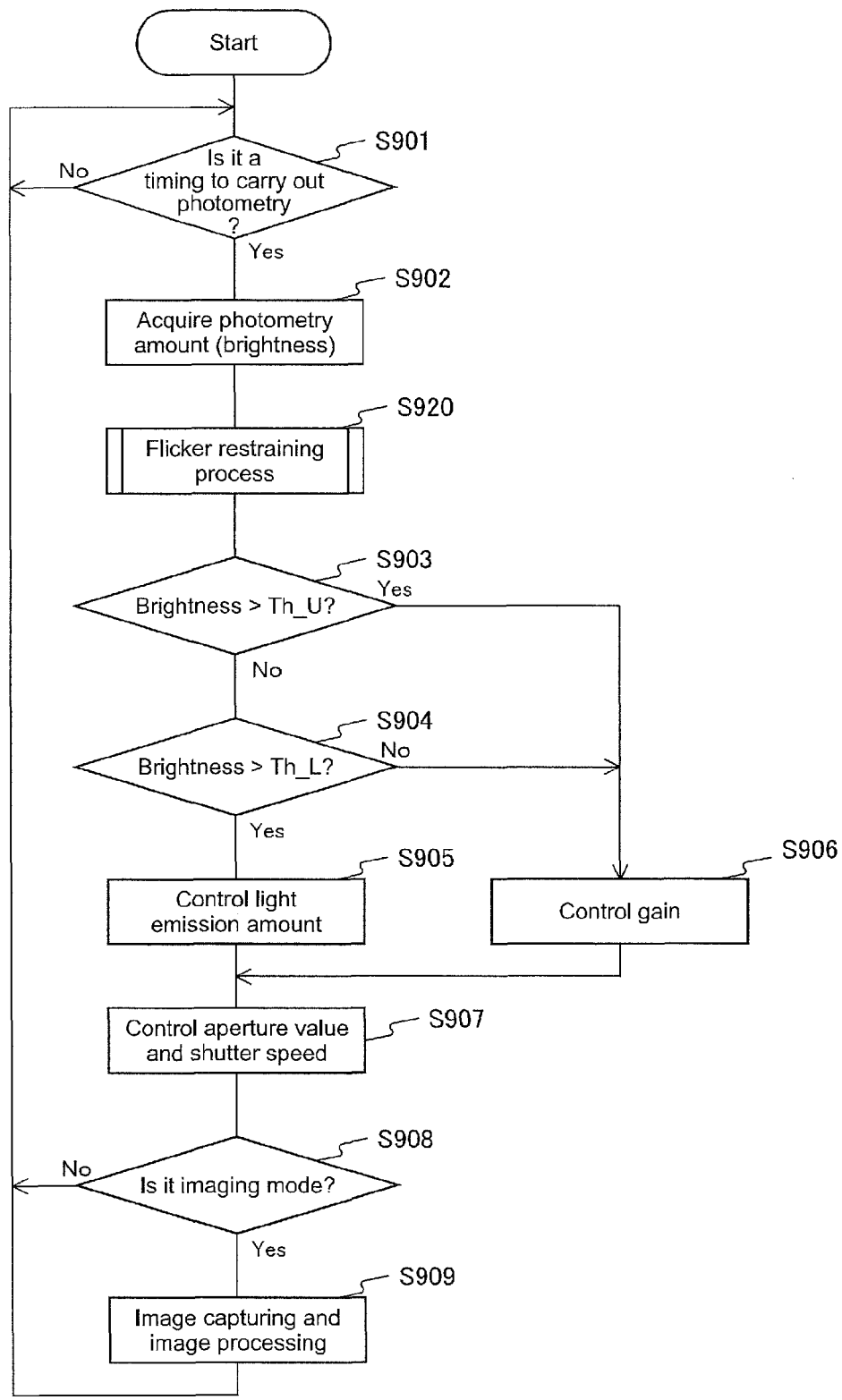
FIG. 4 is a flow chart showing an example of an operation of an image capturing apparatus according to the first embodiment.

FIG. 4 is a flow chart showing an example of an operation of an image capturing apparatus according to the first embodiment. The operation is started when the image capturing apparatus is turned on, for example. The image capturing apparatus determines whether or not it is a timing that the photometry is carried out (Step S901). A photometry timing is a timing that is synchronized with the vertical synchronization signal, for example. If it is not the photometry timing (Step S901: No), the image capturing apparatus returns to Step S901.

If it is the photometry timing (Step S901: Yes), the image capturing apparatus acquires the photometry amount (for example, brightness) (Step S902). The image capturing apparatus carries out a flicker restraining process (Step S920). Then, the image capturing apparatus determines whether or not the brightness acquired exceeds the upper limit threshold value Th_U (Step S903).

When the brightness is not greater than the upper limit threshold value Th_U (Step S903: No), the image capturing apparatus determines whether or not the brightness exceeds the lower limit threshold value Th_L (Step S904). When the brightness exceeds the lower limit threshold value Th_L (Step S904: Yes), the image capturing apparatus controls the light emission amount in response to the brightness (Step S905).

When the brightness exceeds the upper limit threshold value Th_U (Step S903: Yes) or when the brightness is not greater than the lower limit threshold value Th_L (Step S904: No), the image capturing apparatus controls a gain in response to the brightness (Step S906).

The image capturing apparatus controls at least one of the aperture value and the shutter speed in response to the brightness (Steps S907). Then, the image capturing apparatus determines whether or not it is in the image capturing mode (Step S908). When it is not in the image capturing mode (Step S908: No), the image capturing apparatus returns to Step S901. When it is in the image capturing mode (Step S908: Yes), the image capturing apparatus carries out image capturing and image processing (Step S909), and returns to Step S901.

Figure 5:
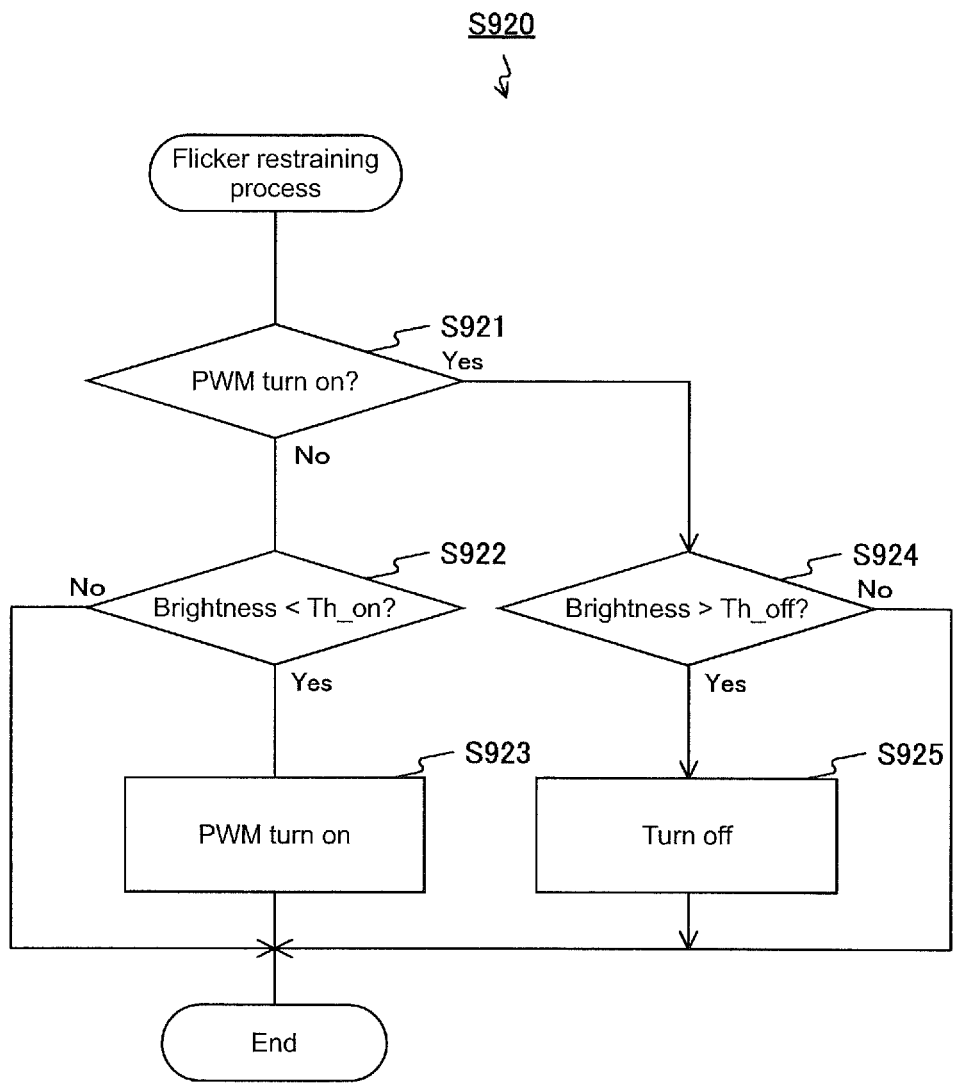
FIG. 5 is a flow chart showing an example of a flicker restraining process according to the first embodiment.

FIG. 5 is a flow chart showing an example of a flicker restraining process according to the first embodiment. The image capturing apparatus determines whether or not the light emission unit 300 is PWM turned on (Step S921). When the light emission unit 300 is not PWM turned on (Step S921: No), the image capturing apparatus whether or not the brightness is less than a turn on threshold value Th_on (Step S922). When the brightness is less than the turn on threshold value Th_on (Step S922: Yes), the image capturing apparatus PWM turns on the light emission unit 300 (Step S923).

When the light emission unit 300 is PWM turned on (Step S921: Yes), the image capturing apparatus determines whether or not the brightness exceeds a turn off threshold value Th_off (Step S924). When the brightness exceeds a turn off threshold value Th_off (Step S924: Yes), the image capturing apparatus stops generating the pulse signal and turns off the light emission unit 300 (Step S925).

When the brightness is not less than the turn on threshold value Th_on (Step S922: No), when the brightness is not greater than turn off threshold value Th_off (Step S924: No), or after Step S923 or S925, the image capturing apparatus ends the flicker restraining process.

Figure 6A:
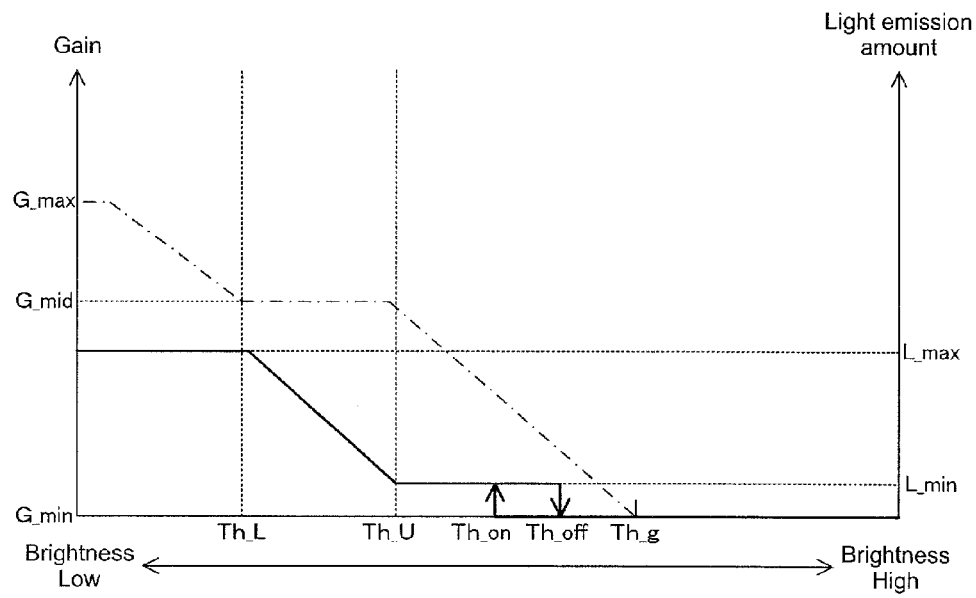
FIGS. 6A and 6B are graphs each showing an example of an exposure control according to the first embodiment.
Figure 6B:
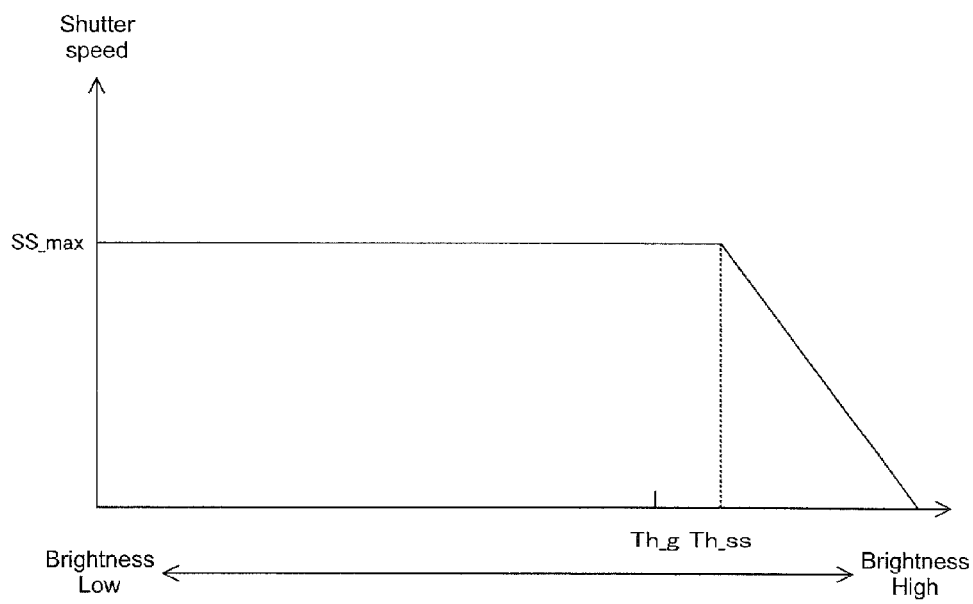

FIGS. 6A and 6B are graphs each showing an example of an exposure control according to the first embodiment. FIG. 6A is a graph showing an example of gain and light emission amount control. In the graph, a vertical axis represents a gain or a light emission amount, and a horizontal axis represents brightness.

The image capturing apparatus increases a gain as brightness is lower when the brightness is not greater than a gain control start threshold value Th_g and exceeds the upper limit threshold value Th_U. The image capturing apparatus sets the gain to a constant value G_mid when the brightness is not greater than the upper limit threshold value Th_U and exceeds the lower limit threshold value Th_L. The image capturing apparatus increases the gain as the brightness is lower within a range not greater than a maximum value G_max of the gain controllable when the brightness is not greater than the lower limit threshold value Th_L.

The image capturing apparatus starts the PWM turn on when the brightness is less than the turn on threshold value Th_on during the turn off, and turns off the light emission unit 300 when the brightness exceeds the turn off threshold value Th_off during the PWM turn on. The turn on threshold value Th_on is set to have a value greater than the upper limit threshold value Th_U, and the turn off threshold value Th_off is set to have a value greater than the turn on threshold value Th_on. In an opposite manner, the turn off threshold value Th_off may be set to have a value lower than the turn on threshold value Th_on.

The image capturing apparatus increases the light emission amount as the brightness is lower when the brightness is not greater than the upper limit threshold value Th_U and exceeds the lower limit threshold value Th_L during the PWM turn on. The image capturing apparatus sets the light emission amount to the minimum value L_min when the brightness exceeds the upper limit threshold value Th_U and sets the light emission amount to the maximum value L_max when the brightness is not greater than the lower limit threshold value Th_L.

In general, when image is captured under artificial light emitted from the light emission unit 300 etc., an image quality may be lowered as compared to under natural light of sun or moon. The natural light is a parallel light source. In contrast, the artificial light is a point light source. Therefore, a shape of a shadow generated by the light may be changed. When image is captured under the artificial light having a color temperature that is not coincident with that of the natural light, an image having an unnatural color shade may be captured.

For this purpose, within the range where the brightness exceeds the lower limit threshold value Th_L (where the light emission amount is controllable), it is possible to suppress a deterioration of the image due to the artificial light source as low as possible by gradually increasing the light emission amount as the brightness is decreased not by emitting light at a maximum light emission amount. In this way, the image capturing apparatus can improve the image quality.

In general, as the gain is increased, the noise of the image signal after amplification is increased and the image quality is decreased. For this reason, the image capturing apparatus can suppress a decrease in the image quality by holding the gain constant within the certain light amount range from the lower limit threshold value Th_L to the upper limit threshold value Th_U.

FIG. 6B is a graph showing an example of a shutter speed. In the graph, a vertical axis represents a shutter speed, and a horizontal axis represents brightness. The image capturing apparatus controls the shutter speed in response to the brightness when the brightness exceeds a shutter control end threshold value Th_ss. The shutter control end threshold value Th_ss is set to a value greater than the gain control start threshold value Th_g. When the brightness is not greater than the shutter control end threshold value Th_ss, the image capturing apparatus sets the shutter speed to a maximum value SS_max.

In this way, according to the first embodiment of the present technology, as the image capturing apparatus controls the light emission amount and holds the gain constant in response to the photometry amount when the photometry amount is within the certain light amount range, an increase of the gain is suppressed within the range, thereby increasing the image quality.

Alternative Embodiment

In the first embodiment, the image capturing apparatus specifies the range for controlling the light emission amount by the two threshold values, i.e., the upper limit threshold value Th_U and the lower limit threshold value Th_L. Alternatively, the range for controlling the light emission amount may be specified only by the upper limit threshold value Th_U. The image capturing apparatus in an alternative embodiment is different from the image capturing apparatus in the first embodiment in that the light emission amount is controlled within the range not greater than the upper limit threshold value Th_U.

Figure 7:
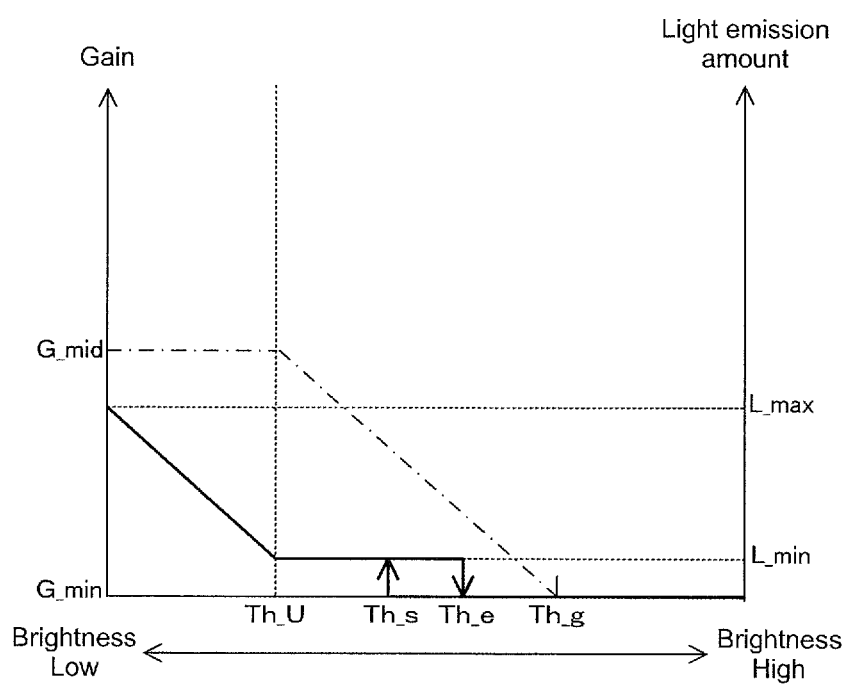
FIG. 7 is a graph showing an example of an exposure control according to an alternative embodiment of the first embodiment.

FIG. 7 is a graph showing an example of an exposure control according to the alternative embodiment of the first embodiment. The image capturing apparatus according to the alternative embodiment controls a gain in response to brightness when the brightness exceeds the upper limit threshold value Th_U. On the other hand, the brightness is not greater than the upper limit threshold value Th_U, the image capturing apparatus controls the light emission amount in response to the brightness.

2. Second Embodiment

Configuration Example of Image Capturing Apparatus

In the first embodiment, the frequency of the pulse signal is set separately from the frequency of the vertical synchronization signal. It is desirable that the frequency of the pulse signal be provided by multiplying a vertical synchronous frequency. When the exposure time is controlled by synchronizing with the clock signal having the frequency provided by multiplying the vertical synchronous frequency in the image sensor 140, the frequency of the pulse signal is provided by multiplying the vertical synchronous frequency, whereby each exposure amount during the exposure time can be constant. The image capturing apparatus in the second embodiment is different from the image capturing apparatus in the first embodiment in that there is provided the pulse signal having the frequency provided by multiplying the vertical synchronous frequency.

Figure 8:
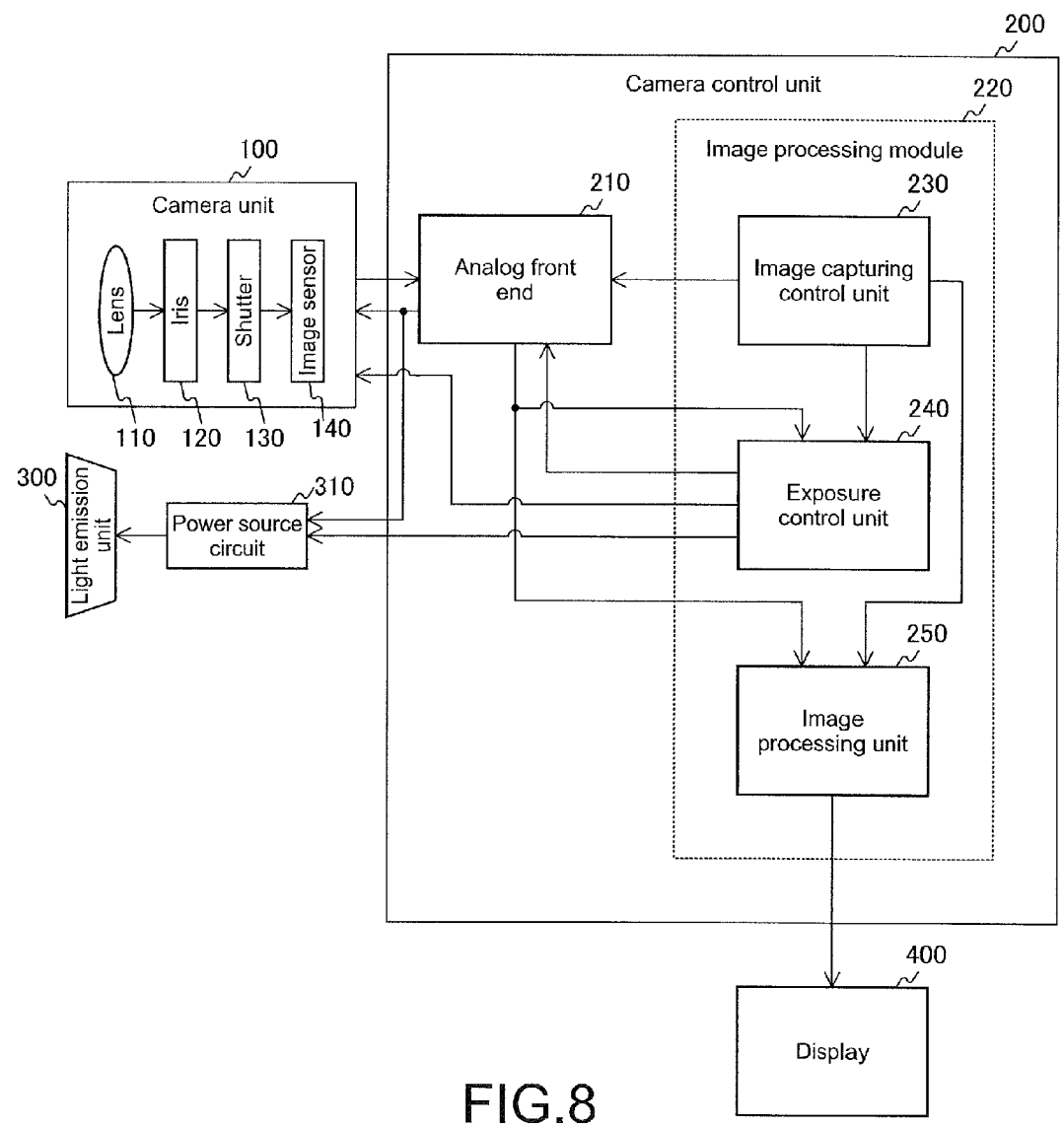
FIG. 8 is a block diagram showing a configuration example of an image capturing apparatus according to a second embodiment.

FIG. 8 is a block diagram showing a configuration example of an image capturing apparatus according to the second embodiment. The analog front end 210 in the second embodiment generates the timing signal including the clock signal having the frequency provided by multiplying the vertical synchronous frequency and the vertical synchronization signal. The clock signal is used for controlling the exposure time. The analog front end 210 further feeds the power source circuit 310 with the timing signal.

The exposure control unit 240 in the second embodiment controls the shutter speed by the above-described global shutter system. The start timing of the exposure (that is, the timing for opening the shutter) is controlled by synchronizing with the vertical synchronization signal. The end timing of the exposure (that is, the timing for closing the shutter) is controlled by synchronizing with the clock signal having the frequency provided by multiplying the vertical synchronous frequency.

The power source circuit 310 in the second embodiment starts to generate the pulse signal by synchronizing with the vertical synchronization signal of the timing signal when the exposure control unit 240 issues an instruction to emit light.

Figure 9:
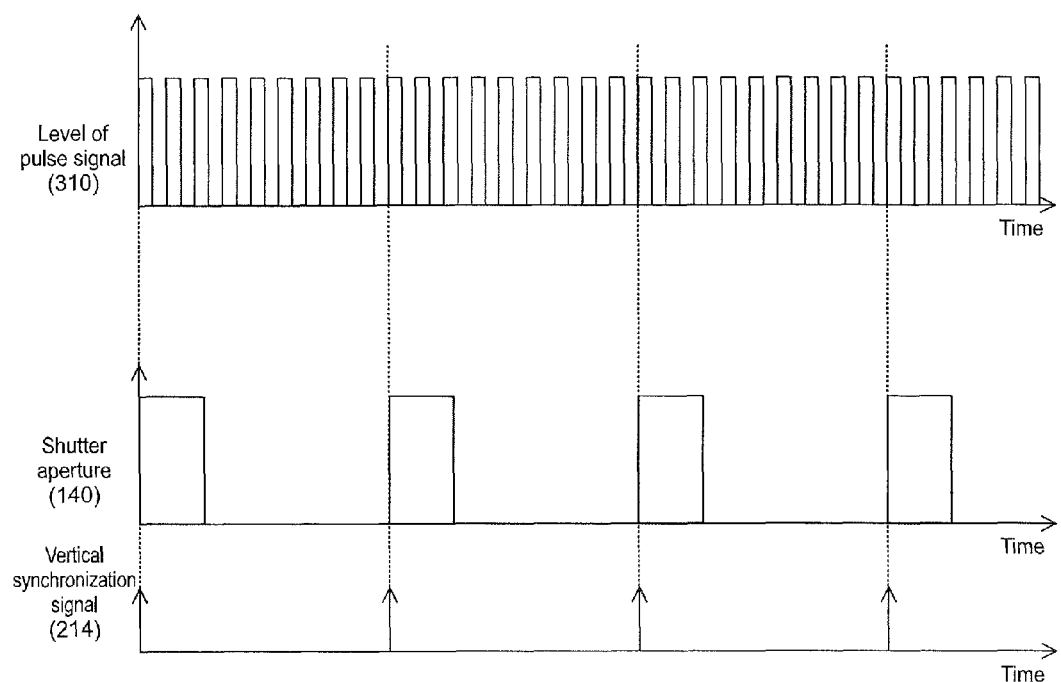
FIG. 9 shows an example of controlling a light emission amount according to the second embodiment.

FIG. 9 shows an example of controlling a light emission amount according to the second embodiment. The power source circuit 310 starts to feed the pulse signal by synchronizing with the vertical synchronization signal. The frequency of the pulse signal is set to have the value provided by multiplying the vertical synchronous frequency.

An electronic shutter of the image sensor 140 opens at the timing for synchronizing with the vertical synchronization signal, and closes at the timing for synchronizing with the clock signal provided by multiplying the vertical synchronous frequency.

Thus, according to the second embodiment of the present technology, the image capturing apparatus controls the light emission amount by the pulse signal having the frequency provided by multiplying the vertical synchronous frequency, whereby each exposure amount during the exposure time can be constant.

Alternative Embodiment

In the second embodiment, the image capturing apparatus starts to expose by synchronizing with the vertical synchronization signal. Alternatively, the image capturing apparatus can start to expose by synchronizing with the clock signal having the frequency greater than that of the vertical synchronization signal. The image capturing apparatus according to the alternative embodiment is different from the image capturing apparatus in the second embodiment in that the exposure is started by synchronizing with the clock signal having the frequency greater than that of the vertical synchronization signal.

The exposure control unit 240 according to the alternative embodiment controls the start and end timing of the exposure by synchronizing with the clock signal having the frequency provided by multiplying the vertical synchronous frequency. Also, the power source circuit 310 according to the alternative embodiment controls the start and end timing of the generation of the pulse signal by synchronizing with the clock signal.

Figure 10:
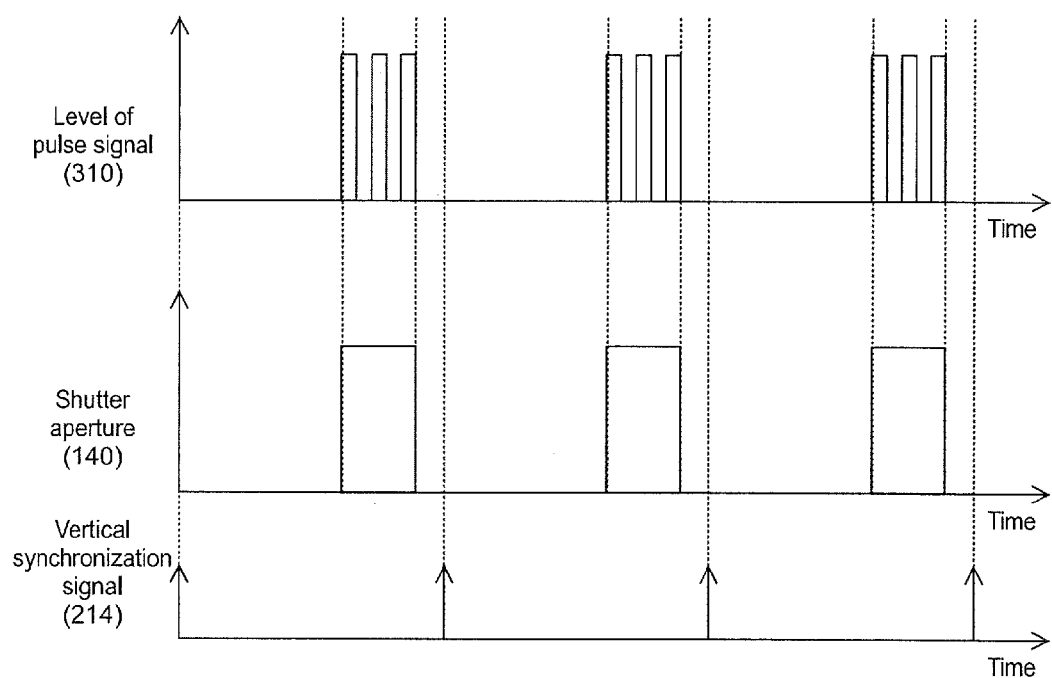
FIG. 10 shows an example of controlling a light emission amount according to the alternative embodiment of the second embodiment.

FIG. 10 shows an example of controlling a light emission amount according to the alternative embodiment of the second embodiment. As shown in FIG. 10, the image sensor 140 controls a time to open the electronic shutter (i.e., the exposure time) by synchronizing with the clock signal having the frequency provided by multiplying the vertical synchronous frequency. Also, the power source circuit 310 controls the start and end timing of the feed of the pulse signal by synchronizing with the clock signal. Thus, when the exposure is started by synchronizing with the timing signal having the frequency greater than that of the vertical synchronization signal, each exposure amount during the exposure time becomes constant.

The above-mentioned embodiments are exemplary only for carrying out the present technology. There is a correspondence relationship between all matters in the embodiments and all matters specifying the invention claimed in claims. Similarly, there is a correspondence relationship between all matters specifying the invention claimed in claims and all matters having the same terms in the embodiments according to the present technology. However, the present technology is not limited to the particular disclosed embodiments. Variations and modifications may be made to embody the present technology without departing from the scope thereof.

The procedures described in the above-mentioned embodiments may be regarded as a method including a series of procedures. Also, they may be regarded as a program or a recording medium storing the program for carrying out a series of the procedures by a computer. As the recording medium, a CD (Compact Disc), an MD (Mini-Disc), a DVD (Digital Versatile Disc), a memory card, a Blu-ray™ Disc or the like can be used, for example.

The present technology may have the following configurations.

(1) An exposure control apparatus, including:

a photometry amount acquisition unit for acquiring a measured light amount as a photometry amount;

a light emission amount control unit for increasing a light emission amount of a light emission unit as the photometry amount is smaller when the photometry amount is within a certain light amount range; and a gain control unit for increasing a gain to an output signal of an image sensor as the photometry amount is smaller when the photometry amount is not within the light amount range and setting the gain to a constant value when the photometry amount is within the light amount range.

(2) The exposure control apparatus according to (1) above, in which the light emission amount control unit sets the light emission amount to a constant amount when the photometry amount is not within the light amount range.

(3) The exposure control apparatus according to (1) or (2) above, in which the light emission control unit turns on the light emission unit when the photometry amount acquired during the light emission unit is turned off is less than one of two threshold values, and turns off the light emission unit when the photometry amount acquired during the light emission unit is turned on exceeds the rest of the two threshold values.

(4) The exposure control apparatus according to any one of (1) to (3) above, further including:

an exposure time control unit for controlling an exposure time of the image sensor by synchronizing with a timing signal having a frequency provided by multiplying a reference frequency; and a pulse signal generation unit for generating a pulse signal having a frequency provided by multiplying the reference frequency, in which the light emission unit emits light depending on a pulse width of the pulse signal.

(5) The exposure control apparatus according to (4) above, in which the exposure time control unit starts to expose the image sensor by synchronizing with the timing signal, and the light emission amount control unit starts to emit light in the light emission unit by synchronizing with the timing signal.

(6) An image capturing apparatus, including:

a photometry amount acquisition unit for acquiring a measured light amount as a photometry amount;

a light emission amount control unit for increasing a light emission amount of a light emission unit as the photometry amount is smaller when the photometry amount is within a certain light amount range;

a gain control unit for increasing a gain to an output signal of an image sensor as the photometry amount is smaller when the photometry amount is not within the light amount range and setting the gain to a constant value when the photometry amount is within the light amount range; and an image capturing unit for image capturing an image including the output signal.

(7) A method of controlling exposure, including:

acquiring a measured light amount as a photometry amount;

controlling a light emission amount by increasing a light emission amount of a light emission unit as the photometry amount is smaller when the photometry amount is within a certain light amount range; and controlling a gain by increasing the gain to an output signal of an image sensor as the photometry amount is smaller when the photometry amount is not within the light amount range and setting the gain to a constant value when the photometry amount is within the light amount range.

It should be understood by those skilled in the art that various modifications, combinations, sub-combinations and alterations may occur depending on design requirements and other factors insofar as they are within the scope of the appended claims or the equivalents thereof.

What is claimed is:

1. An exposure control apparatus, comprising:
    a photometry amount acquisition unit configured to acquire a measured light amount as a photometry amount;
    a light emission amount control unit configured to increase a light emission amount of a light emission unit when the photometry amount is between a first threshold value and a second threshold value; and
    a gain control unit configured to increase a gain to an output signal of an image sensor when the photometry amount is less than a third threshold value; and
    the gain control unit configured to set the gain to a constant value when the photometry amount is between the third threshold value and a fourth threshold value.

2. The exposure control apparatus according to claim 1, wherein
    the light emission control unit turns on the light emission unit when the photometry amount acquired during the light emission unit is turned off is less than one of two threshold values, and turns off the light emission unit when the photometry amount acquired during the light emission unit is turned on exceeds the rest of the two threshold values.

3. An exposure control apparatus, comprising:
    a photometry amount acquisition unit for acquiring a measured light amount as a photometry amount;
    a light emission amount control unit for increasing a light emission amount of a light emission unit when the photometry amount is within a certain light amount range;
    a gain control unit for increasing a gain to an output signal of an image sensor when the photometry amount is not within the light amount range and setting the gain to a constant value when the photometry amount is within the light amount range;
    an exposure time control unit for controlling an exposure time of the image sensor by synchronizing with a timing signal having a frequency provided by multiplying a reference frequency; and
    a pulse signal generation unit for generating a pulse signal having a frequency provided by multiplying the reference frequency,
    wherein the light emission unit emits light depending on a pulse width of the pulse signal.

4. An exposure control apparatus, comprising:
    a photometry amount acquisition unit for acquiring a measured light amount as a photometry amount;
    a light emission amount control unit for increasing a light emission amount of a light emission when the photometry amount is within a certain light amount range;
    a gain control unit for increasing a gain to an output signal of an image sensor when the photometry amount is not within the light amount range and setting the gain to a constant value when the photometry amount is within the light amount range;
    an exposure time control unit for controlling an exposure time of the image sensor by synchronizing with a timing signal having a frequency provided by multiplying a reference frequency; and
    a pulse signal generation unit for generating a pulse signal having a frequency provided by multiplying the reference frequency, wherein
        the light emission unit emits light depending on a pulse width of the pulse signal,
        the exposure time control unit starts to expose the image sensor by synchronizing with the timing signal, and
        the light emission amount control unit starts to emit light in the light emission unit by synchronizing with the timing signal.

5. An image capturing apparatus, comprising:
    a photometry amount acquisition unit configured to acquire a measured light amount as a photometry amount;
    a light emission amount control unit configured to increase a light emission amount of a light emission unit when the photometry amount is between a first threshold value and a second threshold value; and
    a gain control unit configured to increase the gain to the output signal of the image sensor when the photometry amount is less than a third threshold value; and
    the gain control unit configured to set the gain to a constant value when the photometry amount is between the third threshold value and a fourth threshold value; and
    an image capturing unit for image capturing an image including the output signal.

6. A method of controlling exposure, comprising:
    acquiring a measured light amount as a photometry amount;
    controlling a light emission amount by increasing a light emission amount of a light emission unit when the photometry amount is between a first threshold value and a second threshold value; and
    controlling a gain by increasing the gain to the output signal of the image sensor when the photometry amount is less than a third threshold value and setting the gain to a constant value when the photometry amount is between the third threshold value and a fourth threshold value.

7. The image capturing apparatus according to claim 5, wherein
the light emission control unit turns on the light emission unit when the photometry amount acquired during the light emission unit is turned off is less than one of two threshold values, and turns off the light emission unit when the photometry amount acquired during the light emission unit is turned on exceeds the rest of the two threshold values.

8. The image capturing apparatus according to claim 5, further comprising:
an exposure time control unit for controlling an exposure time of the image sensor by synchronizing with a timing signal having a frequency provided by multiplying a reference frequency; and
a pulse signal generation unit for generating a pulse signal having a frequency provided by multiplying the reference frequency,
wherein the light emission unit emits light depending on a pulse width of the pulse signal.

9. The image capturing apparatus according to claim 8, wherein
the exposure time control unit starts to expose the image sensor by synchronizing with the timing signal, and
the light emission amount control unit starts to emit light in the light emission unit by synchronizing with the timing signal.

10. The exposure control apparatus according to claim 1, further comprising:
an exposure time control unit for controlling an exposure time of the image sensor by synchronizing with a timing signal having a frequency provided by multiplying a reference frequency; and
a pulse signal generation unit for generating a pulse signal having a frequency provided by multiplying the reference frequency,
wherein the light emission unit emits light depending on a pulse width of the pulse signal.

11. The exposure control apparatus according to claim 3, wherein
the exposure time control unit starts to expose the image sensor by synchronizing with the timing signal, and
the light emission amount control unit starts to emit light in the light emission unit by synchronizing with the timing signal.

12. The exposure control apparatus according to claim 1, wherein
the third threshold value and the fourth threshold value are less than the first threshold value and the second threshold value.

13. The image capturing apparatus according to claim 5, wherein
the third threshold value and the fourth threshold value are less than the first threshold value and the second threshold value.

14. The method of controlling exposure according to claim 6, wherein
the third threshold value and the fourth threshold value are less than the first threshold value and the second threshold value.

* * * * *